US012761484B2

(12) United States Patent
Kalinowski et al.

(10) Patent No.: US 12,761,484 B2
(45) Date of Patent: *Oct. 13, 2026

(54) HEAD-MOUNTED DISPLAY SYSTEMS WITH ALIGNMENT MONITORING

(71) Applicant: Apple Inc., Cupertino, CA (US)

(72) Inventors: David A. Kalinowski, Davis, CA (US); Brian S. Lau, Seattle, WA (US); Cameron A. Harder, San Francisco, CA (US); Fletcher R. Rothkopf, Los Altos, CA (US)

( * ) Notice: Subject to any disclaimer, the term of this patent is extended or adjusted under 35 U.S.C. 154(b) by 169 days.

This patent is subject to a terminal disclaimer.

(21) Appl. No.: 18/805,187

(22) Filed: Aug. 14, 2024

(65) Prior Publication Data

US 2024/0402500 A1 Dec. 5, 2024

Related U.S. Application Data

(63) Continuation of application No. 18/358,709, filed on Jul. 25, 2023, now Pat. No. 12,092,829, which is a (Continued)

(51) Int. Cl.
*G02B 27/01* (2006.01)
*G06F 3/01* (2006.01)
(Continued)

(52) U.S. Cl.
CPC ..... *G02B 27/0172* (2013.01); *G02B 27/0179* (2013.01); *G06F 3/013* (2013.01); *G06T 3/18* (2024.01); *G06T 5/80* (2024.01); *G06T 7/70* (2017.01); *G09G 3/002* (2013.01); *G09G 3/003* (2013.01); *G09G 5/37* (2013.01);
(Continued)

(58) Field of Classification Search
None
See application file for complete search history.

(56) References Cited

U.S. PATENT DOCUMENTS 6,377,401 B1 4/2002 Bartlett
6,563,626 B1 5/2003 Iwasaki
(Continued)

FOREIGN PATENT DOCUMENTS

DE 102018222231 A1 * 6/2020 ............... G06T 7/60

*Primary Examiner* — Jwalant Amin
(74) *Attorney, Agent, or Firm* — Treyz Law Group, P.C.; Jinie M. Guihan

(57) ABSTRACT

A head-mounted device may have a left display and a right display that provide respective left and right images. Left and right optical combiner systems may be configured to pass real-world light to left and right eye boxes while directing the left and right images respectively to the left and right eye boxes. Misalignment of the left and right images with respect to the left and right eye boxes may be detected using gaze tracking systems, using cameras such as front-facing cameras in conjunction with a database of known real-world object properties, using visual inertial odometry systems formed from cameras and inertial measurement units, or using one or more sensors in a portable head-mounted device case or other item with a receptacle configured to receive a head-mounted device. Compensating adjustments may be made to the images based on the measured misalignment.

20 Claims, 8 Drawing Sheets

Related U.S. Application Data continuation of application No. 17/191,183, filed on Mar. 3, 2021, now Pat. No. 11,763,779.

(60) Provisional application No. 63/014,599, filed on Apr. 23, 2020.

(51) Int. Cl.

| | |
|---|---|
| ***G06T 3/18*** | (2024.01) |
| ***G06T 5/80*** | (2024.01) |
| ***G06T 7/70*** | (2017.01) |
| ***G09G 3/00*** | (2006.01) |
| ***G09G 5/37*** | (2006.01) |
| ***H04N 13/239*** | (2018.01) |
| ***H04N 23/57*** | (2023.01) |
| ***H04N 23/90*** | (2023.01) |
| *H04N 23/54* | (2023.01) |

(52) U.S. Cl.

CPC ........... *H04N 13/239* (2018.05); *H04N 23/57* (2023.01); *H04N 23/90* (2023.01); *G02B 2027/0134* (2013.01); *G02B 2027/0138* (2013.01); *G02B 2027/0187* (2013.01); *G06T 2207/10048* (2013.01); *G09G 2320/0693* (2013.01); *G09G 2340/0471* (2013.01); *G09G 2340/14* (2013.01); *G09G 2354/00* (2013.01); *G09G 2360/145* (2013.01); *H04N 23/54* (2023.01)

(56) References Cited

U.S. PATENT DOCUMENTS

| | | | | |
|---|---|---|---|---|
| 7,589,902 | B2 | 9/2009 | Garoutte et al. | |
| 8,398,242 | B2 | 3/2013 | Yamamoto et al. | |
| 8,629,815 | B2 | 1/2014 | Brin et al. | |
| 9,788,714 | B2 | 10/2017 | Krueger | |
| 10,073,268 | B2 * | 9/2018 | Alexander | H04N 9/3129 |
| 10,313,656 | B2 | 6/2019 | Sadi et al. | |
| 10,345,600 | B1 | 7/2019 | Chi et al. | |
| 10,482,677 | B1 | 11/2019 | Iyer et al. | |
| 11,269,406 | B1 | 3/2022 | Sztuk et al. | |
| 11,307,415 | B1 * | 4/2022 | Sharma | G02B 3/14 |
| 11,455,031 | B1 | 9/2022 | Sharma et al. | |
| 11,579,182 | B1 * | 2/2023 | Brodoceanu | G01R 31/27 |
| 2013/0170031 | A1 | 7/2013 | Bohn et al. | |
| 2014/0168264 | A1 | 6/2014 | Harrison et al. | |
| 2019/0124313 | A1 | 4/2019 | Li et al. | |
| 2019/0155021 | A1 | 5/2019 | Wall et al. | |
| 2019/0387168 | A1 | 12/2019 | Smith et al. | |
| 2020/0209628 | A1 | 7/2020 | Sztuk et al. | |
| 2021/0068652 | A1 | 3/2021 | Nistico | |
| 2023/0393398 | A1 | 12/2023 | Oh et al. | |

* cited by examiner

HEAD-MOUNTED DISPLAY SYSTEMS WITH ALIGNMENT MONITORING

This application is a continuation of non-provisional patent application Ser. No. 18/358,709, filed Jul. 25, 2023, which is a continuation of non-provisional patent application Ser. No. 17/191,183, filed Mar. 3, 2021, now U.S. Pat. No. 11,763,779, which claims the benefit of provisional patent application No. 63/014,599, filed Apr. 23, 2020, which are hereby incorporated by reference herein in their entireties.

FIELD

This relates generally to electronic devices, and, more particularly, to electronic devices such as head-mounted devices.

BACKGROUND

Electronic devices such as head-mounted devices may have displays for displaying images. The displays may be housed in a head-mounted support structure.

SUMMARY

An electronic device such as a head mounted device may display images for a user. The head-mounted device may have a left display and a right display that provide respective left and right images. Left and right optical combiner systems may pass real-world image light to left and right eye boxes while directing the left and right display images respectively to the left and right eye boxes. The displays and optical combiner systems may be mounted in a head-mounted support structure. Due to a drop event or other stress on the head-mounted support structure, optical components in the head-mounted device such as the displays and optical combiner systems can become misaligned, leading to misalignment of the images relative to the eye boxes.

Misalignment of the left and right images with respect to the left and right eye boxes may be detected using gaze tracking systems, using cameras such as front-facing cameras in conjunction with a database of known real-world object properties, using visual inertial odometry systems formed from cameras and inertial measurement units, or using one or more sensors in a portable head-mounted device case or other item with a receptacle configured to receive a head-mounted device. Control circuitry in the head-mounted device may apply a geometric transform to image data provided to the displays, thereby warping the images produced by the displays to compensate for the measured misalignment.

DETAILED DESCRIPTION

Electronic devices such as head-mounted devices may include displays and other components for presenting content to users. A head-mounted device may have head-mounted support structures that allow the head-mounted device to be worn on a user's head. The head-mounted support structures may support optical components such as displays for displaying visual content. In some configurations, a head-mounted device may have gaze tracking components for monitoring a user's gaze. A head-mounted device may also be provided with cameras such as front-facing cameras. Using electronic components in the head-mounted device such as gaze tracking systems, cameras, inertial measurement units, and/or other sensors, misalignment between electronic components in the head-mounted device and resulting misalignment of images presented to a user may be monitored. If misalignment is detected, image content being displayed for a user can be adjusted in real time to compensate for the misalignment. For example, a geometric transform may be applied to image data being supplied to a display so that the images output by the display are warped to compensate for measured misalignment. In this way, images for the user's eyes can be aligned as desired, even when the head-mounted support structures flex or otherwise change shape during use.

Figure 1:
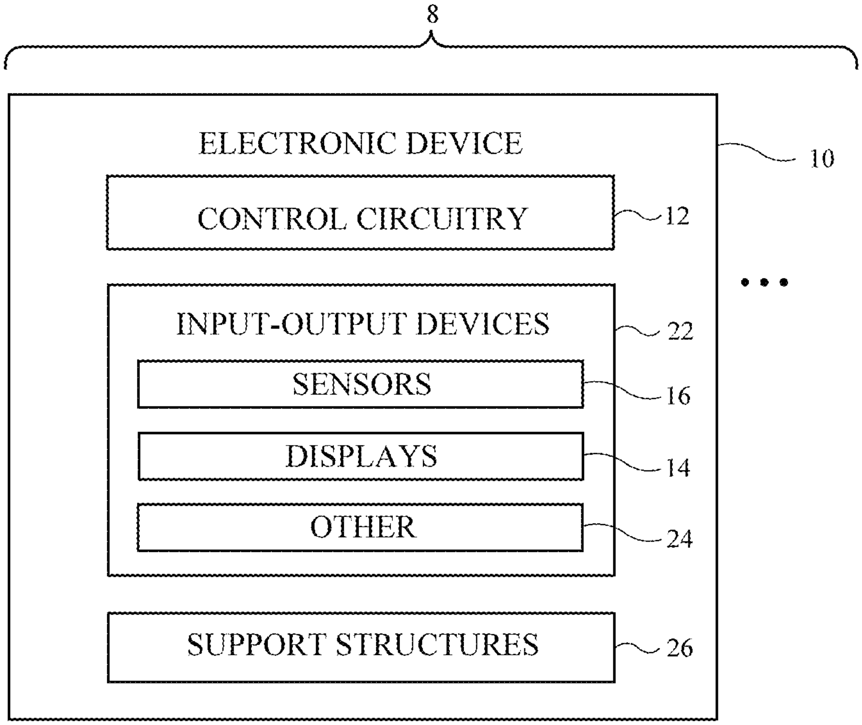
FIG. 1 is a schematic diagram of an illustrative electronic device such as a head-mounted display device in accordance with an embodiment.

A schematic diagram of an illustrative system that may include a head-mounted device is shown in FIG. 1. As shown in FIG. 1, system 8 may include one or more electronic devices such as electronic device 10. The electronic devices of system 8 may include computers, cellular telephones, head-mounted devices, wristwatch devices, and other electronic devices. Configurations in which electronic device 10 is a head-mounted device are sometimes described herein as an example.

As shown in FIG. 1, electronic devices such as electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involving the adjustment of the components of device 10 using control signals, etc.). Control circuitry 12 may include wired and wireless communications circuitry. For example, control circuitry 12 may include radio-frequency transceiver circuitry such as cellular telephone transceiver circuitry, wireless local area network transceiver circuitry (e.g., WiFi® circuitry), millimeter wave transceiver circuitry, and/or other wireless communications circuitry.

During operation, the communications circuitry of the devices in system 8 (e.g., the communications circuitry of control circuitry 12 of device 10), may be used to support communication between the electronic devices. For example, one electronic device may transmit video data, audio data, and/or other data to another electronic device in system 8. Electronic devices in system 8 may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

Device 10 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 1, input-output devices 22 may include one or more displays such as displays 14. In some configurations, device 10 includes left and right display devices (e.g., left and right components such as left and right scanning mirror display devices or other image projectors, liquid-crystal-on-silicon display devices, digital mirror devices, or other reflective display devices, left and right display panels based on light-emitting diode pixel arrays (e.g., organic light-emitting display panels or display devices based on pixel arrays formed from crystalline semiconductor light-emitting diode dies), liquid crystal display panels, and/or or other left and right display devices that provide images to left and right eye boxes for viewing by the user's left and right eyes, respectively. Illustrative configurations in which device 10 has left and right display devices such as left and right projectors that provide respective left and right images for a user's left and right eyes may sometimes be described herein as an example.

Displays 14 are used to display visual content for a user of device 10. The content that is presented on displays 14 may include virtual objects and other content that is provided to displays 14 by control circuitry 12. This virtual content may sometimes be referred to as computer-generated content. Computer-generated content may be displayed in the absence of real-world content or may be combined with real-world content. In some configurations, a real-world image may be captured by a camera (e.g., a forward-facing camera, sometimes referred to as a front-facing camera) so that computer-generated content may be electronically overlaid on portions of the real-world image (e.g., when device 10 is a pair of virtual reality goggles with an opaque display). In other configurations, an optical coupling system may be used to allow computer-generated content to be optically overlaid on top of a real-world image. As an example, device 10 may have a see-through display system that provides a computer-generated image to a user through a beam splitter, prism, holographic coupler, or other optical coupler while allowing the user to view real-world objects through the optical coupler.

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, capacitive proximity sensors, light-based (optical) proximity sensors, other proximity sensors, force sensors, sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), and/or other sensors.

User input and other information may be gathered using sensors and other input devices in input-output devices 22. If desired, input-output devices 22 may include other devices 24 such as haptic output devices (e.g., vibrating components), light-emitting diodes and other light sources, speakers such as car speakers for producing audio output, circuits for receiving wireless power, circuits for transmitting power wirelessly to other devices, batteries and other energy storage devices (e.g., capacitors), joysticks, buttons, and/or other components.

Electronic device 10 may have housing structures (e.g., housing walls, straps, etc.), as shown by illustrative support structures 26 of FIG. 1. In configurations in which electronic device 10 is a head-mounted device (e.g., a pair of glasses, goggles, a helmet, a hat, etc.), support structures 26 may include head-mounted support structures (e.g., a helmet housing, head straps, temples in a pair of eyeglasses, goggle housing structures, and/or other head-mounted structures). The head-mounted support structures may be configured to be worn on a head of a user during operation of device 10 and may support displays 14, sensors 16, other components 24, other input-output devices 22, and control circuitry 12.

Figure 2:
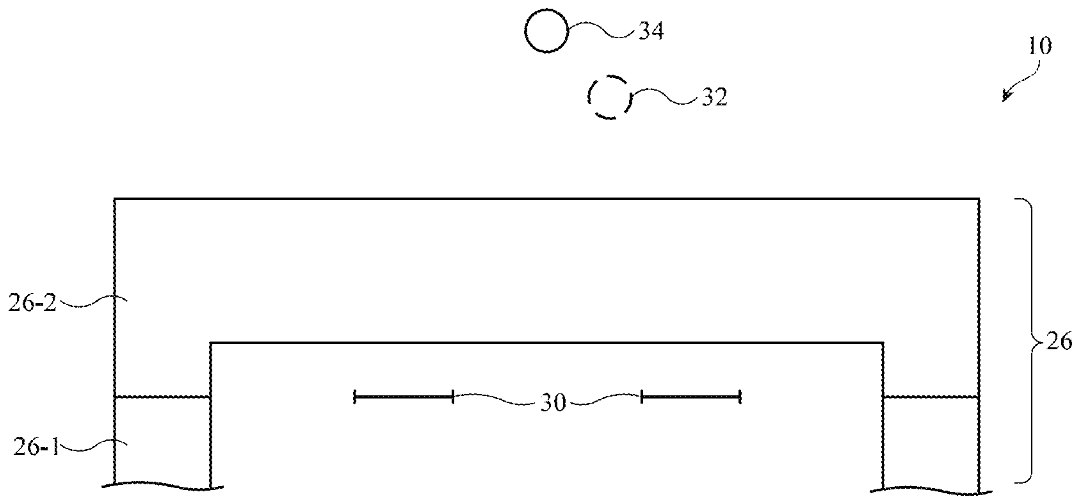
FIG. 2 is a top view of an illustrative head-mounted device in accordance with an embodiment.

FIG. 2 is a top view of electronic device 10 in an illustrative configuration in which electronic device 10 is a head-mounted device. As shown in FIG. 2, electronic device 10 may include head-mounted support structure 26 to house the components of device 10 and to support device 10 on a user's head. Support structure 26 may include, for example, structures that form housing walls and other structures at the front of device 10 (e.g., support structures 26-2, which may form frame structures such as a nose bridge, end pieces, and/or other housing structures) and additional structures such as straps, temples, or other supplemental support structures (e.g., support structures 26-1) that help to hold the main unit and the components in the main unit on a user's face so that the user's eyes are located within eye boxes 30.

During operation of device 10, images are presented to a user's eyes in eye boxes 30. Eye boxes 30 include a left eye box that receives a left image and a right eye box that receives a right image. Device 10 may include a left display system with a left display 14 that presents the left image to the left eye box and a right display system with a right display 14 that presents the right image to the right eye box. In an illustrative configuration, each display system may have an optical combiner assembly that helps combine display images (e.g., computer-generated image 32 of FIG. 2, sometimes referred to as a virtual image) with real-world image light (e.g., light from real-world objects such as object 34 of FIG. 2). Optical combiner assemblies may include optical couplers, waveguides, and/or other components.

Figure 3:
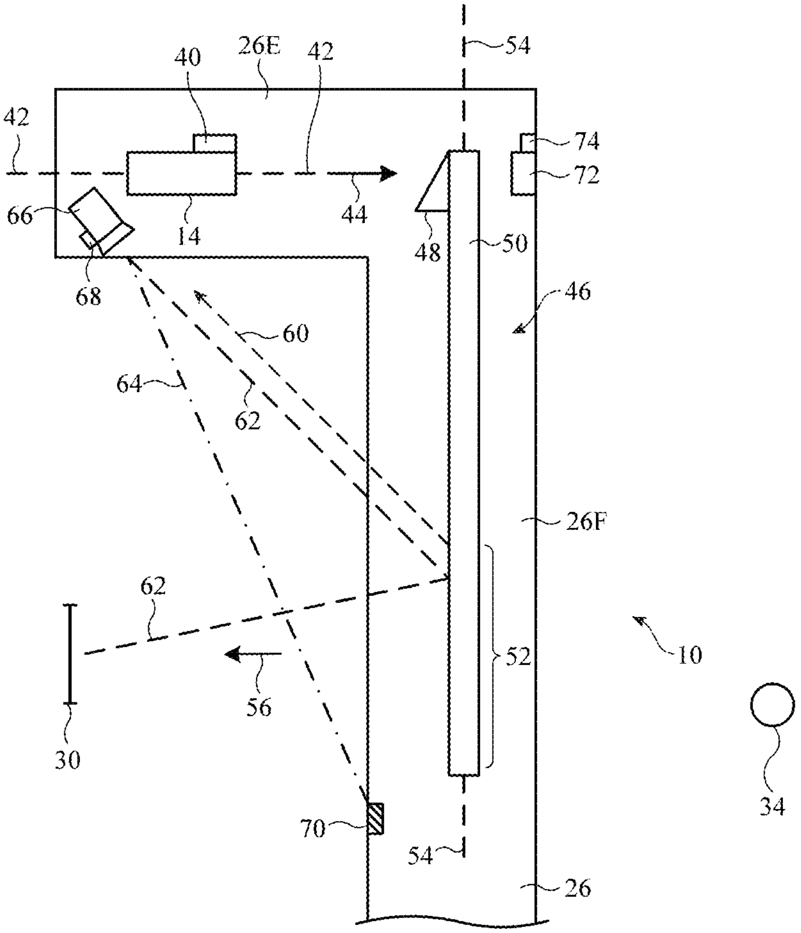
FIG. 3 is a top view of a portion of an illustrative head-mounted device in accordance with an embodiment.

Displays 14 may, if desired, include display devices such as projectors. A portion (e.g., a left-hand portion) of an illustrative head-mounted device with a projector display is shown in FIG. 3. As shown in FIG. 3, device 10 may include head-mounted support structure 26. Side portion 26E of structure 26 may contain display (projector) 14 and may, if desired, include an associated light-emitting device (e.g., a laser, a light-emitting diode, etc.) such as light-emitting diode 40 that is separate from display 14 but that is coupled to display 14 or an adjacent rigid portion of side portion 26E. Display 14 and light-emitting diode 40 may be aligned with axis 42, which runs along the side of the user's head when head-mounted support structure 26 is worn by a user. During operation, display 14 provides an image in direction 44.

Optical combiner assembly 46 may be supported in front portion 26F of head-mounted support structure 26. Optical combiner assembly 46 may receive the image provided by display 14 and may direct this image to a user's eye in eye box 30 in direction 56. As shown in FIG. 3, optical combiner assembly 46 may include an input coupler such as input coupler 48, a waveguide such as waveguide 50, and an output coupler such as output coupler 52. Waveguide 50 may be formed from a transparent layer of polymer, glass, or other clear material and may have an elongated shape that extends along axis 54 (e.g., across the front of a user's face). Input coupler 48 and output coupler 52 may be formed from gratings, holograms, prisms, and/or other optical coupling structures and these structures may be attached to the exterior of waveguide 50 and/or may be formed in the material of waveguide 50.

Output coupler 52 may be transparent to allow a user to view real-world objects such as object 34 through output coupler 52 (e.g., real-world image light from object 34 may pass through output coupler 52 of optical coupler assembly 46 to eye box 30). Input coupler 48 may be configured to receive the image from display 14 that is provided in direction 44 and to couple the received image into waveguide 50. The image then travels along the length of waveguide 50 to output coupler 52. Output coupler 52 may direct the guided image light rearwardly out of waveguide 50 towards eye box 30 in direction 56.

While a user is viewing an image in eye box 30, the direction in which the user's eye is pointed (sometimes referred to as the user's gaze or direction of gaze) may be monitored using gaze tracking system 66. Gaze tracking system 66 may include a camera (e.g., a camera that is sensitive to infrared light and/or visible light) that views the user's eye in eye box 30 along optical path 62. In some configurations, gaze tracking system 66 may have an associated light source such as light source 68 (e.g., one or more infrared and/or visible light-emitting diodes or other light-emitting devices). Light from light source 68 (e.g., infrared light) may travel along optical path 62 to eye box 30 to illuminate the user's eye in eye box 30.

Optical path 62 may include a first segment between system 66 and output coupler 52 and a second segment between output coupler 52 and eye box 30. Output coupler 52 may be configured to reflect light associated with light source 68. For example, light source 68 may emit infrared light and output coupler 52 may be configured to reflect this infrared light. As shown in FIG. 3, the infrared light from light source 68 may travel along the first segment from light source 68 to output coupler 52 and, after reflecting from output coupler 52, may travel along the second segment to eye box 30. This illuminates the user's eye with infrared light. Light (e.g., infrared image light) associated with the user's illuminated eye in eye box 30 may travel along the second segment of path 62, may reflect from output coupler 52, and may subsequently travel along the first segment of path 62 to the infrared camera of gaze tracking system 66. In this way, infrared light may be used to illuminate the user's eye and provide a gaze tracking image to system 66 (e.g., an image sensor in system 66 that is sensitive to infrared light). By monitoring direct light-emitting device reflections (glints) and/or the shape of the user's pupil in infrared images captured with gaze tracking system 66, system 66 may be used to monitor the direction of the user's gaze. This information may be used as an input to device 10 during operation of device 10 (e.g., to determine the location in a scene to which a user's attention is directed), may be used in determining which portion of the image from display 14 should be provided with enhanced resolution in a foveated imaging system, and/or may otherwise be used in operating device 10.

To avoid user discomfort and ensure that images are displayed satisfactorily for a user, it may be desirable to monitor for potential optical component misalignment and associated image misalignment and to correct for detected misalignment. Alignment may be monitored using gaze tracking system 66, front facing cameras (e.g., cameras 72), inertial measurement units 74, and/or other electrical components.

Consider, as an example, the arrangement of FIG. 3. In this type of configuration, optical combiner assembly 46 (e.g., a grating in output coupler 52) can be configured to direct (e.g., diffract) a portion of the visible image light from display 14 towards gaze tracking system 66 along path 60. In the event that deformation of housing 26 misaligns display 14 relative to optical combiner assembly 46 (e.g., by allowing axis 44 to move relative to axis 54, which could adversely affect the placement of the image from display 14 relative to eye box 30), gaze tracking camera 66 will detect a corresponding movement in the position of the image light from display 14 and will therefore be able to measure this misalignment. Misalignment may involve image shifts, rotations, etc.

Another way in which image misalignment and optical component misalignment (e.g., misalignment between display 14 and optical combiner assembly 46) may be measured is using light from light source 40. Light source 40 (e.g., a laser, light-emitting diode, or other light-emitting device that is mounted to display 14 or an adjacent rigidly coupled portion of structure 26E) may emit visible and/or infrared light in direction 44 and this light may be directed towards gaze tracking system 66 by output coupler 52 along path 60 (e.g., using a grating or other structure in output coupler 52). By detecting deflections in the position of this light, gaze tracking system 66 may measure misalignment between display 14 and optical coupling system 46 and can therefore measure associated misalignment between the image directed to eye box 30 and eye box 30. The light emitted by light-emitting device 40 may be infrared light and/or visible light.

If desired, optical misalignment between an image and eye box 30 and associated component misalignment (e.g., misalignment between display 14 and optical combiner assembly 46) may be measured by using gaze tracking system 66 to capture images of support structures 26 (e.g., front portion 26F of support structure 26). By measuring movement between portion 26F and side portion 26E of structure 26 within which system 66 is mounted, movement between camera 14 on side portion 26E and optical combiner assembly 46 on front portion 26F may be detected. If desired, one or more patterned areas may be provided on support structure 26. For example, a recognizable mark such as fiducial 70 (e.g., a cross or other patterned element, a retroreflector, etc.) may be provided on front portion 26F of support structure 26. Fiducial 70 or other portion of structure 26F may be illuminated by light from a light source such as light-emitting diode 68 or ambient light. For example, light from light-emitting diode 68 may produce a frame glint due to a direct reflection of the light from support structure 26 (e.g., portion 26F). By measuring movement of fiducial 70 or other portion of support 26 (e.g., portion 26F), gaze tracking system 66 can measure movement of optical combiner assembly 46 and thereby detect optical component misalignment and associated image misalignment relative to eye box 30.

When deformation of structure 26 (e.g., bending between side portion 26E and front portion 26F) causes display 14 (e.g., axis 44) to become misoriented relative to optical combiner assembly 46 and thereby causes the image from display 14 to become misaligned with respect to eye box 30, control circuitry 12 can take corrective action. For example, control circuitry 12 can be configured to shift or otherwise warp the image being displayed by display 14 by an amount that is based on the amount of measured misalignment, thereby compensating for the misalignment and ensuring that the displayed image is not misaligned relative to eye box 30 even though optical components of device 10 are physically misaligned. By applying an image warping transform (e.g., a geometric image transform such as an image shift, an image shear, image rotation, etc.) to the image data being provided to display 14 and therefore warping the image at the output of display 14 in real time, the image will remain satisfactorily aligned with respect to eye box 30. This approach may be used to maintain image alignment between the left image from the left display 14 and the left eye box 30, to maintain image alignment between the right image from the right display 14 and the right eye box 30, and/or to maintain image alignment between the left and right images and their associated left and right eye boxes.

Figure 4:
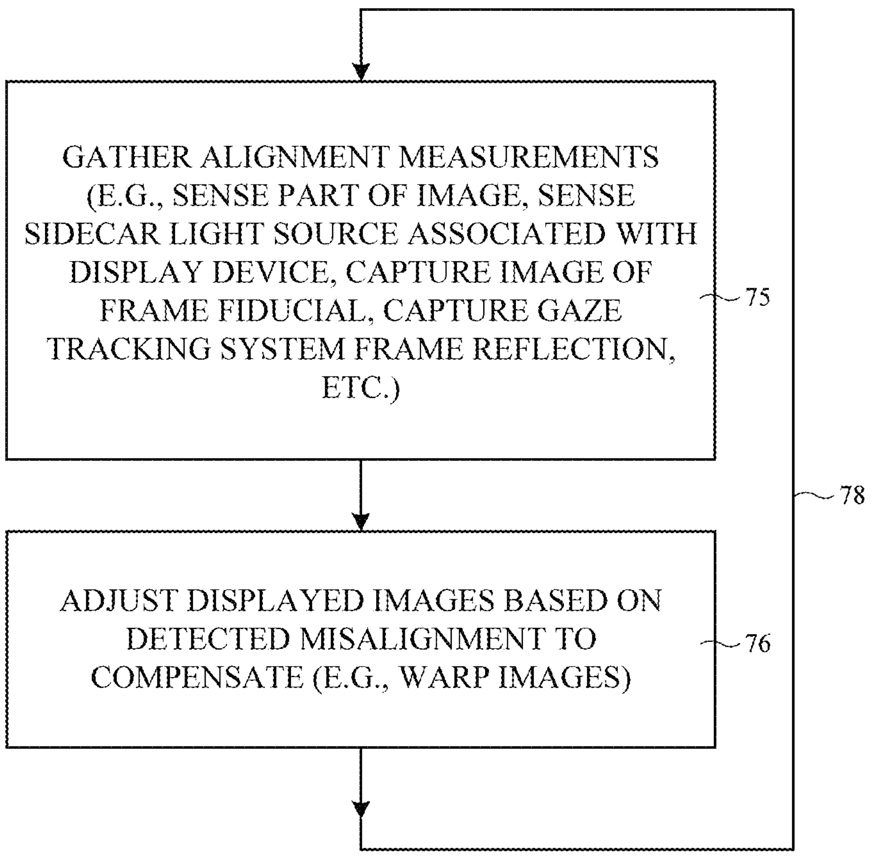
FIG. 4 is a flow chart of illustrative operations involved in monitoring optical component alignment in a head-mounted device of the type shown in FIG. 3 in accordance with an embodiment.

Illustrative operations involved in operating a head-mounted device such as device 10 of FIG. 3 are shown in FIG. 4.

During the operations of block 75, sensors 16 (e.g., gaze tracking system 66) may be used to gather information on the orientation of optical components in device 10 and thereby measure associated image misalignment with respect to eye boxes 30, as described in connection with FIG. 3. For example, gaze tracking system 66 and display 14 may be rigidly coupled by structures in side portion 26E of support structure 26. This ensures that system 66 can track deflections of portion 26F and therefore measure any misalignment of optical combiner assembly 46 relative to display 14. In measuring misalignment, system 66 may measure part of the image provided by display 14 that is directed to system 66 along path 60, may measure light from a sidecar light source such as light-emitting diode 40 (e.g., light that is provided by a device other than display 14 but that is aligned with the image provided by display 14 due to the attachment or close coupling between the device and display 14), may measure the location of fiducial 70 or other portion of structure 26F, and/or may measure the location of a reflection of light from light-emitting diode 68 or other light source from structure 26F (e.g., a frame glint).

These measurements of image misalignment and optical component misalignment may then be used, during the operations of block 76 to warp images from displays 14 to compensate for the misalignment. In particular, during the operations of block 76, control circuitry 12 may process image data (e.g., displayed images on left and/or right displays 14) to compensate for misalignment measured by systems 66 on the right and/or left sides of device 10. For example, if it is determined that deformation of support 26 has caused a left image to shift leftward in a left eye box 30, the image produced by the left display 14 may be shifted by a corresponding amount to ensure that the compensated left image is no longer shifted relative to the left eye box 30 but rather is aligned with eye box 30 as if there were no optical component misalignment. The image warping transforms that are applied during misalignment compensation operations may include geometrical transforms such as shifts, shears, rotations, etc.

As shown by line 78, the optical component orientation measurements of block 75 to detect misalignment and the corresponding misalignment compensation image processing adjustments that are performed at block 76 may be performed continuously (e.g., periodically such as every T seconds, where T is at least 1 microsecond, at least 1 ms, at least 1 s, at least 100 s, less than 100 hours, less than 1 hour, less than 10 minutes, or other suitable time period), upon detection of a drop event, upon power up, in response to a user-initiated calibration request, etc.

Figure 5:
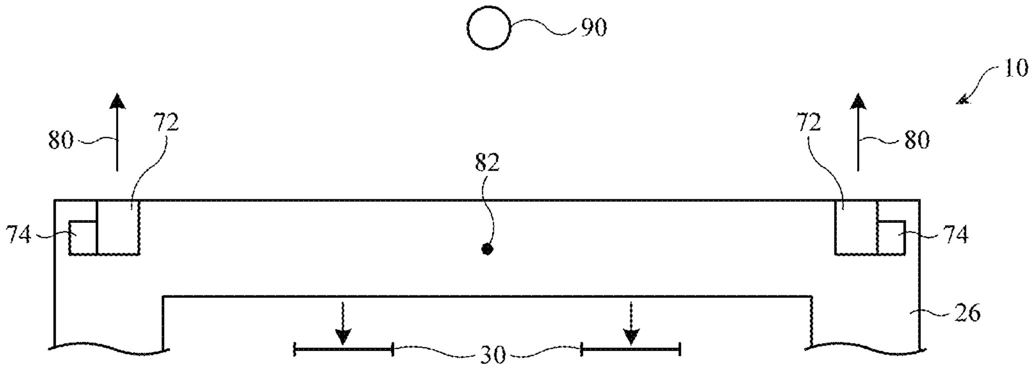
FIG. 5 is a top view of an illustrative head-mounted device with left and right sides in accordance with an embodiment.

As shown in FIG. 5, in addition to displays 14 and optical combiner systems 46, device 10 may have components such as cameras 72 and inertial measurement units 74. Cameras 72 may be, for example, front-facing (forward facing) cameras that face outwardly in directions 80 towards real-life objects such as object 90 while facing away from eye boxes 30. There may be one or more cameras 72 on either side of device 10. Cameras 72 may operate at visible light wavelengths and/or infrared light wavelengths. If desired, cameras 72 may include cameras that face to the sides of device 10 and/or in other directions. Inertial measurement units 74 may be coupled to cameras 72 (or may be mounted to adjacent rigid portions of structure 26).

During operation of device 10, cameras 72 may gather real-world image data while inertial measurement units 74 (e.g., units containing accelerometers, compasses, and/or gyroscopes such as six-degrees-of-freedom inertial measurement units) gather associated orientation measurements. Using information from cameras 72 and/or orientation sensors such as inertial measurement units 74, device 10 can monitor the orientations of the left and right portions of structure 26 (e.g., to determine whether structure 26 has bent about axis 82 so that the left and right images from the left and right portions of device 10 are misaligned with respect to each other and with respect to left and right eye boxes 30). For example, if this orientation information indicates that cameras 72 are pointing away from each other more than expected, control circuitry 12 can conclude that displays 14 and optical combiner assemblies 46 on the left and right of structure 26 have been bent away from each other about axis 82 and that the images in the left and right eye boxes 30 should therefore be shifted relative to each other to compensate and thereby ensure that the images remain aligned with the left and right eye boxes 30.

One way in which device 10 can gather information on the orientation of the portions of structure 26 supporting displays 14 and optical combiner assemblies 46 involves the use of cameras 72 to capture images of real-world objects that are compared to known size and shape information on the objects in a database. Device 10 and/or other equipment in system 8 (e.g., a remote server, a tethered device, etc.) may, for example, store information on the sizes and shapes of certain objects. These objects may be electronic devices (e.g., cellular telephones of particular types, computers of certain models, or other known electronic devices) or may be other well-known items (e.g., everyday objects and/or other objects normally encountered outdoors or indoors of known size and shape). When cameras 72 capture images of such database objects, the apparent sizes of the objects can be used in determining the distance to the objects and therefore can be used in helping measure the orientation of each camera 72 relative to the objects. Image recognition operations may be used, for example, to identify which object is present in a captured image and subsequent comparison operations may be performed to the known attributes of the object that are stored in the database to determine orientation.

If desired, cameras and inertial measurement units can operate in conjunction with each other to form visual inertial odometry (VIO) systems. For example, the camera 72 and inertial measurement unit 74 on the left side of device 10 can operate together as a left visual inertial odometry system that gathers orientation information on the left side of support 26 (and that therefore measures misalignment of the left image in the left eye box 30). The camera 72 and inertial measurement unit 74 on the right side of device 10 can likewise operate together as a right visual inertial odometry system that gathers orientation information on the right side of support 26 (and therefore measures misalignment of the right image in the right eye box 30). Visual inertial odometry systems operate using both camera data from cameras 72 and orientation data from inertial measurement units 74 and may therefore be more accurate and responsive than systems that use only camera data or only inertial measurement unit data (although such single-sensor orientation data may be used in device 10, if desired).

Figure 6:
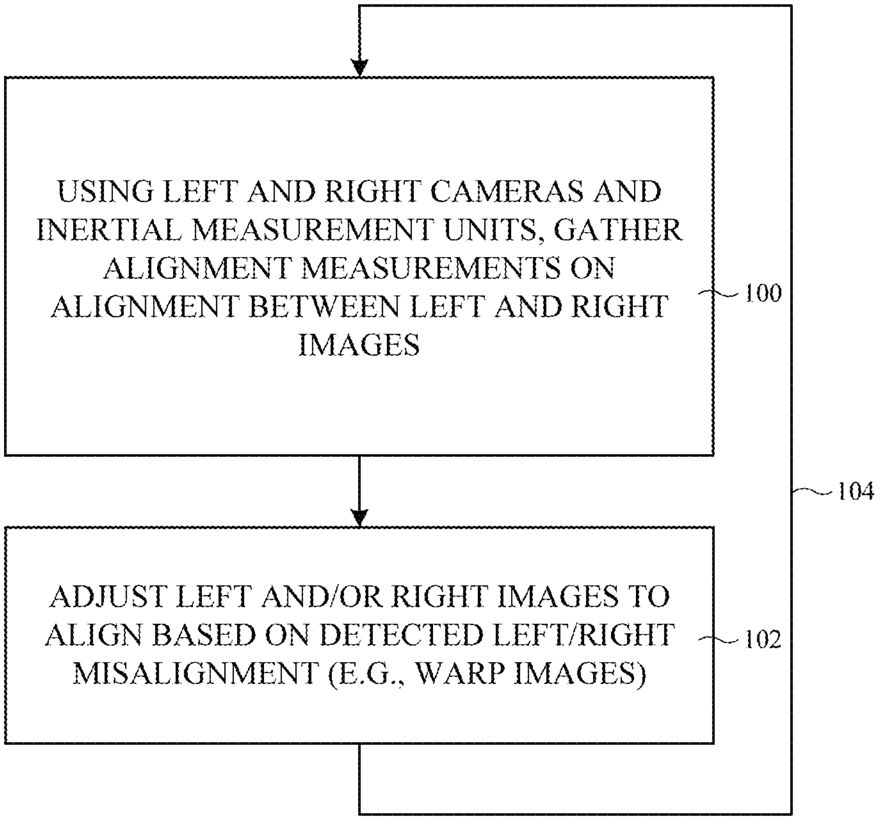
FIG. 6 is a flow chart of illustrative operations involved in monitoring alignment of left and right images in a head-mounted device of the type shown in FIG. 5 in accordance with an embodiment.

Illustrative operations involved in operating a head-mounted device such as device 10 of FIG. 5 are shown in FIG. 6.

During the operations of block 100, cameras 72 and/or inertial measurement units 74 may gather information on the orientation of the left and right portions of structure 26 and therefore information on the misalignment of the left image relative to eye box 30 and information on the misalignment of the right image relative to eye box 30.

In a first illustrative scenario, cameras 72 operate as stereo pairs and are used in conjunction with a database of known object size and shape attributes to produce orientation information. In particular, control circuitry 12 may perform image recognition operations in which known objects from the database are detected and can compare the size and shapes of the objects in the captured images to the known size and shapes of the database images of the objects, thereby determining the distance and orientation of the objects to the cameras. In this way, the orientations of cameras 72 and therefore the orientations of portions of support 26 on the left and right of device 10 relative to each other and to eye boxes 30 can be determined. Misalignment of the left image relative to the right image and/or misalignment of the left and right images relative to the left and right eye boxes respectively can be measured.

In a second illustrative scenario, cameras 72 and inertial measurement units 74 are operated in conjunction with each other to form respective left and right VIO systems that measure the orientation of the left and right sides of structure 26. This allows misalignment to be measured of the left image relative to the right image and/or of the left and right images relative to the left and right eye boxes, respectively.

The image misalignment measurements of block 100 may be used to compensate the images from the left and/or right display systems for misalignment. In particular, during the operations of block 102, control circuitry 12 may shift the left and/or right images based on the misalignment measurements from the camera/database systems or the VIO systems or control circuitry 12 may otherwise warp images associated with displays 14 to compensate for the misalignment. Control circuitry 12 may process image data (e.g., image data for producing displayed images on left and/or right displays 14) to compensate for misalignment measured by the orientation measurement systems located on the right and left sides of device 10. For example, if it is determined that deformation of support 26 has caused a left image to shift leftward in a left eye box 30, the image produced by the left display 14 may be shifted to ensure that the compensated left image is no longer shifted relative to the left eye box 30 but rather is aligned with eye box 30 as if there were no optical component misalignment. The image warping transforms that are applied during misalignment compensation operations may include geometrical transforms such as shifts, shears, rotations, etc. and may be applied to the image data being provided to displays 14 in real time.

As shown by line 104, the image misalignment measurements of block 100 and the corresponding misalignment compensation adjustments that are performed on the images from the left and/or right displays 14 at block 102 may be performed continuously (e.g., periodically such as every T seconds, where T is at least 1 microsecond, at least 1 ms, at least 1 s, at least 100 s, less than 100 hours, less than 1 hour, less than 10 minutes, or other suitable time period), upon detection of a drop event, upon power up, in response to a user-initiated calibration request, etc.

Figure 7:
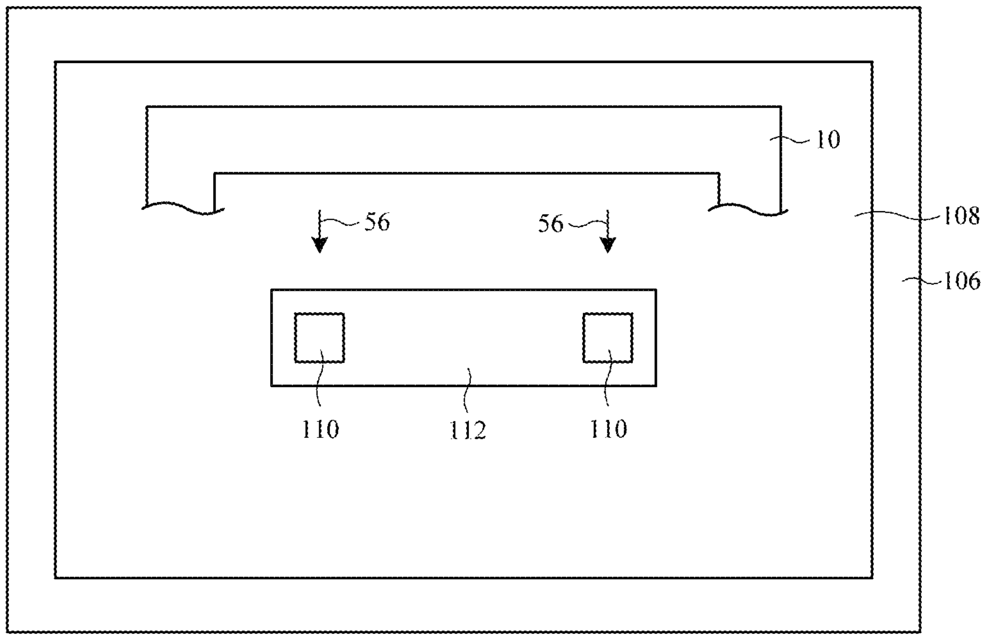
FIG. 7 is a top view of an illustrative item with a receptacle that has received a head-mounted device in accordance with an embodiment.

FIG. 7 is a diagram of another illustrative arrangement for calibrating device 10 to compensate for image misalignment. In the example of FIG. 7, item 106 forms a receptacle such as receptacle 108 that receives device 10. Item 106 may be tabletop equipment located in a factory or store, may be a user's portable carrying case for device 10 (e.g., a zippered enclosure with first and second portions that open and close using a hinge, etc.), or may be other suitable equipment with a recess (e.g., a cavity) or other shape suitable for receiving and securing device 10 (e.g., receptacle 108).

Item 106 may include one or more sensors 110. Sensors 110 may include one or more sensors 16 such as cameras. When it is desired to calibrate device 10 and thereby measure any misalignment in the left and right images being displayed by device 10, device 10 may be turned on and directed to produce images in directions 56. During these operations, device 10 is not worn on a user's head, but rather is maintained in a fixed relationship relative to sensors 110 and item 106. Sensors 110, which may be mounted at the locations of eye boxes 30, can capture images of the displayed left and right images for processing by control circuitry in item 106 and/or device 10 to detect misalignment. If desired, portions of item 106 between sensors 110 (see, e.g., portion 112) and/or portions of item 106 between sensors 110 and the portions of receptacle 108 holding device 10 may be formed from rigid structures (rigid polymer, metal, fiber-composite material, etc.) so that measurement accuracy is satisfactory. If desired, sensors 110 may themselves be compensated for misalignment using techniques of the type described in connection with FIGS. 3, 4, 5, and 6.

As device 10 outputs left and right images, respective left and right sensors 110 capture these images and control circuitry in item 106 and/or device 10 analyzes the captured images to measure misalignment of left and right images from device 10 with respect to each other and/or with respect to eye boxes 30 (located at sensors 110 in the configuration of FIG. 7). This misalignment information may then be stored by device 10 to use in subsequent misalignment compensation operations. For example, device 10 may use the misalignment readings from sensors 110 to warp left and/or right images to compensate for the measured misalignment during normal operation of device 10 on a user's head.

If desired, sensors 110 may measure fiducials on structure 26 and/or may otherwise measure misalignment of portions of structure 26 relative to each other (e.g., bending between left and right portions of structure 26) without directly measuring images produced by device 10. In this way, misalignment of the images produced by device 10 can be measured without turning on device 10. The sensor or sensors 110 that measure structure 26 may be optical sensors (e.g. proximity sensors, three-dimensional image sensors, two-dimensional cameras, etc.), electrical sensors, and/or other sensors 16.

Figure 8:
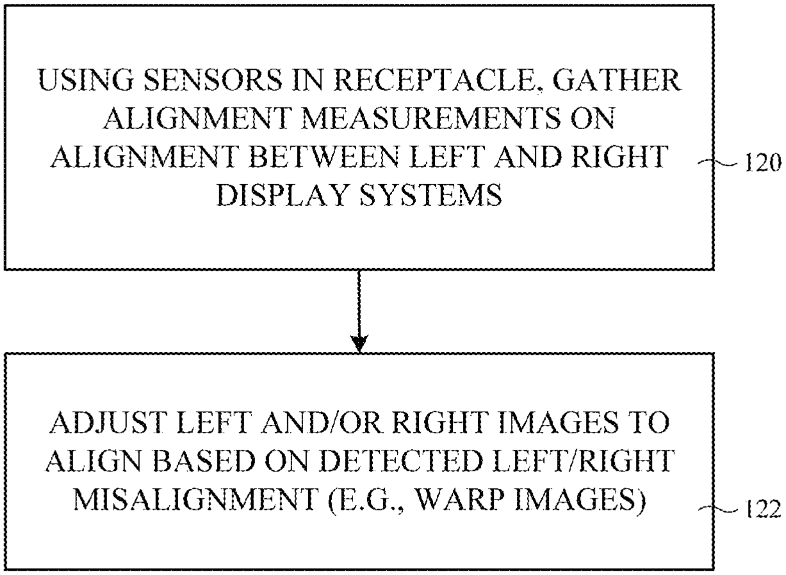
FIG. 8 is flow chart of illustrative operations involved in detecting and correcting for misalignment between left and right display systems in a head-mounted device of the type shown in FIG. 7 in accordance with an embodiment.

Illustrative operations involved in operating a head-mounted device such as device 10 of FIG. 7 are shown in FIG. 8.

During the operations of block 120, device 10 is placed in receptacle 108 of item 106 so that sensors 110 may gather information on misalignment of the images produced by the left and right displays of device 10. Device 10 may produce images during these misalignment measurements or sensors 110 may measure structure 26 while device 10 is not producing images. The measured misalignment of the images may be used to produce corresponding calibration data for compensating for the misalignment. This calibration data may be stored in device 10 for later use. Item 106 may have circuitry of the type shown by device 10 of FIG. 1 and/or other circuitry. For example, item 106 may have wired and/or wireless communications circuitry that item 106 uses to provide the calibration data to device 10.

During the operations of block 122 (e.g., later, after device 10 has been removed from item 106 and is being worn on a user's head), control circuitry 12 may use the stored calibration data (e.g., information on the measured misalignment) to compensate for the measured misalignment. In particular, image misalignment measurements (taken directly from displayed images or indirectly by measuring housing deformation by measuring the shape of structure 26) may be used to warp images from displays 14 to compensate for the misalignment. During the operations of block 122, control circuitry 12 may process image data (e.g., displayed images on left and/or right displays 14) to compensate for misalignment measured by sensor 110 of item 106. For example, if it is determined that deformation of support 26 has caused a left image to shift leftward in a left eye box 30, the image produced by the left display 14 may be shifted by a corresponding amount to ensure that the compensated left image is no longer shifted relative to the left eye box 30 but rather is aligned with eye box 30 as if there were no optical component misalignment. The image warping transforms that are applied during misalignment compensation operations may include geometrical transforms such as shifts, shears, rotations, etc.

Device 10 may be calibrated in this way each time device 10 is placed in item 106 and/or at other suitable times and/or using other suitable misalignment compensation techniques (see, e.g., the illustrative techniques of FIGS. 3, 4, 5, and 6, which may optionally be used in addition to the misalignment calibration operations performed with item 106).

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A head-mounted device, comprising:

a head-mounted support structure;

a display configured to provide an image;

an optical assembly configured to direct the image from the display towards an eye box; and a sensor configured to gather gaze tracking information from the eye box, wherein the optical assembly is configured to provide a portion of the image from the display to the sensor and wherein the sensor is configured to measure a misalignment of the image relative to the eye box by sensing the portion of the image from the display.

2. The head-mounted device defined in claim 1 wherein the sensor comprises a camera.

3. The head-mounted device defined in claim 2 wherein the optical assembly is configured to pass real-world image light to the eye box and wherein the camera is configured to gather the gaze tracking information at an infrared wavelength and is configured to measure the misalignment at a visible light wavelength.

4. The head-mounted device defined in claim 1 further comprising a light source that is configured to emit light that illuminates the eye box.

5. The head-mounted device defined in claim 1 further comprising a light-emitting device separate from the display that is configured to emit light, wherein the sensor is configured to detect the light from the light-emitting device to measure the misalignment.

6. The head-mounted device defined in claim 1 wherein the sensor is configured to measure the misalignment by capturing an image of a portion of the head-mounted support structure.

7. The head-mounted device defined in claim 6 wherein the portion of the head-mounted support structure comprises a fiducial.

8. The head-mounted device defined in claim 1 further comprising a light-emitting device that emits light that reflects from the head-mounted support structure, wherein the sensor is configured to measure the misalignment by detecting the reflected light.

9. The head-mounted device defined in claim 8 wherein the sensor comprises an infrared camera, and the reflected light comprises infrared light.

10. A head-mounted device, comprising:

a head-mounted support structure with first and second opposing sides, wherein the second side is interposed between an eye box and the first side;

a display coupled to the head-mounted support structure and configured to provide an image;

an optical combiner with an output coupler configured to direct the image towards the eye box;

a light-emitting device configured to emit light towards the optical combiner; and a sensor configured to gather gaze tracking information from the eye box, wherein the output coupler is configured to redirect the light from the light-emitting device toward the sensor and the optical combiner is interposed between the sensor and the first side of the head-mounted support structure.

11. The head-mounted device defined in claim 10 wherein the sensor is configured to measure misalignment of the image relative to the eye box by sensing deflections in a position of the light from the light-emitting device.

12. The head-mounted device defined in claim 10 wherein the light from the light-emitting device is infrared light.

13. The head-mounted device defined in claim 10 further comprising an additional light source that is configured to emit additional light that illuminates the eye box, wherein the sensor is configured to gather the gaze tracking information based on the additional light that illuminates the eye box.

14. The head-mounted device defined in claim 13 wherein the additional light is infrared light.

15. The head-mounted device defined in claim 10 wherein the optical combiner comprises a waveguide and an input coupler, wherein the input coupler is configured to couple the image from the display into the waveguide, the input coupler is configured to couple the light from the light-emitting device into the waveguide, and the waveguide is configured to propagate the image and the light from the light-emitting device.

16. A head-mounted device, comprising:

a frame;

a display configured to provide an image and coupled to the frame;

a waveguide configured to direct the image from the display towards an eye box;

a light source configured to emit first light that reflects from the frame and second light that illuminates the eye box; and a sensor configured to gather gaze tracking information from the eye box based at least partly on the second light that illuminates the eye box, wherein the sensor is configured to measure a misalignment of the image relative to the eye box by detecting the first light that reflects from the frame.

17. The head-mounted device defined in claim 16, wherein the sensor is configured to measure the misalignment of the image relative to the eye box by detecting the first light that reflects directly from the frame.

18. The head-mounted device defined in claim 16, wherein the first light comprises infrared light.

19. The head-mounted device defined in claim 16, wherein the first light comprises visible light.

20. The head-mounted device defined in claim 16, wherein the frame has front and rear opposing sides, wherein the rear side is interposed between the eye box and the front side, and wherein the waveguide is interposed between the sensor and the front side of the frame.

* * * * *